United States Patent [19]

Reinauer

[11] Patent Number: 5,658,192

[45] Date of Patent: Aug. 19, 1997

[54] ARRANGEMENT AND CORRESPONDING ADAPTER FOR RECEIVING A ROTATING BODY IN A CENTERED AND AXIALLY FIXED MANNER

[75] Inventor: Josef Reinauer, Sigmaringen, Germany

[73] Assignee: Joerg Guehring, Albstadt, Germany

[21] Appl. No.: 522,360

[22] PCT Filed: Mar. 23, 1994

[86] PCT No.: PCT/EP94/00923

§ 371 Date: Dec. 11, 1995

§ 102(e) Date: Dec. 11, 1995

[87] PCT Pub. No.: WO94/21428

PCT Pub. Date: Sep. 29, 1994

[30] Foreign Application Priority Data

Mar. 23, 1993 [DE] Germany ............... 43 09 321.3

[51] Int. Cl.[6] ....................................... B24B 41/04
[52] U.S. Cl. .................. 451/342; 408/238; 409/232
[58] Field of Search ...................... 82/160; 279/2.12, 279/2.15; 403/277, 292, 297; 408/238, 239 R, 239 A; 409/232, 233; 451/178, 342

[56] References Cited

U.S. PATENT DOCUMENTS

| 1,648,032 | 11/1927 | Starkin . | |
| 2,398,664 | 4/1946 | Paul . | |
| 3,683,566 | 8/1972 | Walters . | |
| 4,251,955 | 2/1981 | Shawke | 451/342 |
| 4,731,955 | 3/1988 | Henle | 451/342 |
| 5,042,207 | 8/1991 | Kim | 451/342 |
| 5,150,995 | 9/1992 | Reinauer . | |
| 5,175,963 | 1/1993 | Schafer et al. | 451/342 |
| 5,177,905 | 1/1993 | Takahashi et al. | 451/342 |
| 5,443,340 | 8/1995 | Reinauer et al. . | |

FOREIGN PATENT DOCUMENTS

| 35 12 366 | 10/1986 | Germany . |
| 36 35 973 | 5/1988 | Germany . |
| 38 34 192 | 4/1990 | Germany . |
| 39 36 631 | 5/1991 | Germany . |
| 43 09 321 | 9/1994 | Germany . |

Primary Examiner—Timothy V. Eley
Attorney, Agent, or Firm—Oblon, Spivak, McClelland, Maier & Neustadt, P.C.

[57] ABSTRACT

An apparatus is disclosed for receiving a rotary body (412) in a centered and axially fixed manner, in particular a grinding wheel, on a supporting part (410) with an axial centering spike (418) which projects in to the central opening (416) of the rotary body (412) and a substantially radial collar (480) adjacent thereto, against which the rotary body (412) may be axially clamped. In order to allow extremely rapidly rotating bodies (412) to be clamped extremely accurately with simple hand grips, an elastically expandable, preferably thin-walled axial extension (440) is arranged between the centering spike (418) and the opening (416). The axial extension (440) is supported on the outer surface of the centering spike (418) and on the inner surface of the opening (416) and together with a clamping plate (436) forms a single adapter piece (434). Preferably a captive clamping mechanism received in the adapter piece (434) and on the supporting piece (410) allow the clamping plate with its radial collar to be pressed against the rotary body (412) while the axial extension (440) is elastically expanded.

29 Claims, 5 Drawing Sheets

ARRANGEMENT AND CORRESPONDING ADAPTER FOR RECEIVING A ROTATING BODY IN A CENTERED AND AXIALLY FIXED MANNER

BACKGROUND OF THE INVENTION

1. Field of the Invention

The invention pertains to an arrangement for receiving a rotating body, in particular a grinding wheel or a high-speed grinding wheel, in a centered and axially fixed manner, as well as a corresponding adapter for clamping a rotating body in a radially and axially fixed manner.

2. Discussion of the Background

When carrying out cutting procedures, it is required to connect a rapidly rotating body with a spindle or another tool carrier, e.g., a tool system module or a workpiece carrier, in a centered and axially fixed manner. This problem occurs particularly with high-speed grinding wheels that operate at peripheral speeds in excess of 100 m/sec. Grinding bodies of this type are formed of high-strength steel disks that are provided with a diamond coating or a CBN (cubic boron nitride) coating, with a trimming of such grinding bodies no longer being carried out. These rotating bodies must be coupled to the drive spindle in such a way that they rotate with high concentricity. One additional problem consists of maintaining as low an eccentricity as possible during the clamping process, while still ensuring a secure axial fastening on the spindle.

In this context, several arrangements of the initially mentioned type have been disclosed. The most widely used solution consists of clamping a grinding wheel that is provided with a cylindrical recess in its center against a radial face surface of the carrier part, namely a cylindrical spike, with the aid of several clamping screws that are uniformly distributed over the circumference. In this case, the play of the clamping screws as well as the play of the centering spike in the central recess of the grinding wheel must be eliminated by means of relatively time-consuming assembly and adjusting procedures.

According to one additional known arrangement, the radial, centered clamping is realized with the aid of four clamping bodies that are respectively situated at an angle of 90° to one another and can be adjusted in the radial direction such that the concentricity can be simultaneously adjusted in a precise manner during the clamping process. Although this arrangement makes it possible to exactly adjust the concentricity of the grinding wheel, a sufficient axial clamping cannot be easily attained in this manner.

It would be conceivable to realize an arrangement of this type in such a way that the receptacle opening in the rotating body, i.e., in the grinding wheel, is designed in conical fashion and that the clamping in an axially and radially fixed manner is attained by pressing the grinding wheel onto the axial centering spike of the hub part which has a complementary conical design by means of a clamping plate. In this case, clamping means that act in the axial direction, e.g., in the form of several clamping screws that are distributed over the circumference, are utilized. The respective heads of said clamping screws are braced on the clamping plate, with the threaded section of said screws being engaged with a part that is rigidly connected to the hub. However, one disadvantage of this variation would be the relatively complicated processing of the centering receptacle hole in the grinding wheel. Even in instances in which a very strict range of tolerance is observed, it is quite problematic to maintain the wobble within the desired narrow ranges of tolerance, in particular with grinding wheels that have a larger axial thickness.

There also exist solutions for arrangements of the aforementioned type which utilize the so-called expansion clamping technique. According to this technique, pockets that are uniformly distributed over the circumference and filled with a hydraulic medium are arranged within the region of the centering spike. These pockets are covered by a thin piece of sheet metal. A uniform centering of the attached grinding wheel is realized by pressurizing these pockets that are filled with a hydraulic medium. This technique makes it possible to adjust the concentricity of the grinding wheel in a very exact manner. However, this clamping technique also requires additional measures for fixing the grinding wheel to the hub with the least possible wobble. This means that this known clamping technique is very complicated and is associated with the additional disadvantage that special devices for generating the pressure re required.

U.S. Pat. No. 1,684,032 discloses a clamping device for positioning a rotating body on a carrier part in centered fashion. The carrier part comprises an axial centering spike that protrudes into a central receptacle opening of the rotating body and a radial collar that is situated adjacent to the axial centering spike. The rotating body can be axially pushed against the radial collar. An axial extension that can be elastically widened is arranged between the centering spike and the receptacle opening, with the inner contour of the axial extension corresponding to the outer contour of the centering spike and the outer contour of the axial extension corresponding to the inner contour of the receptacle opening. The axial extension is connected to a clamping plate so as to form an adapter part. In this case, the clamping plate has a smaller diameter than the axial extension. A central screw with different pitch sections is accommodated in the adapter part. This screw engages with a threaded hole that is arranged in the carrier part. The cylindrical outer surface of the axial extension can be radially pressed against the rotating body, while the axial extension is elastically widened by tightening the aforementioned screw.

DISCLOSURE OF THE INVENTION

Consequently, the invention is based on the objective of disclosing an arrangement for receiving a rotating body, in particular a grinding wheel or a high-speed grinding wheel, in a centered and axially fixed manner. Despite its simple structural design, this arrangement makes it possible to fix even relatively heavy grinding wheels and grinding wheels that have a larger axial thickness onto the hub in an axially and radially fixed manner such that only a minute axial and radial wobble occurs. The arrangement should be realized in such a way that the highest possible flexibility with respect to the design of the hub and the centering spike is attained and that said arrangement makes it possible to combine the clamping principle according to the invention with customary tool system modules.

According to the invention, the grinding wheel is attached by clamping by means of a specially designed adapter the clamping plate of which carries a preferably thin-walled axial extension that is preferably connected to said clamping plate in one piece and can be elastically deformed in the radial direction. The rapidly rotating body, in particular the grinding wheel, is preferably threaded onto said axial extension in a fitted manner. In the clamped condition, this preferably thin-walled axial extension is situated between the receptacle opening of the grinding wheel and the centering spike of the hub part. The hub part that is situated adjacent to the centering spike forms the second radial support surface for the grinding wheel, with said second radial support surface being situated opposite to the clamping plate. At the beginning of the clamping process, the grinding wheel situated on the axial extension can be brought clamping the adapter and the hub together, the axial extension is pressed into the space between the inner surface of the grinding wheel and the outer surface of the centering spike, with the spot-faced radial surface of the clamping plate gradually moving closer to the outer surface of the grinding wheel. During this movement, the axial extension is increasingly widened in the radial direction in an elastic manner, i.e., until the radial collar of the clamping plate is in close contact with the grinding wheel. Consequently, fitting conformities that are contingent on the tolerances are compensated by the radial elasticity of the axial extension, which, when clamping together the adapter and the hub part, comes into an increasingly rigid contact with the receptacle opening of the grinding wheel such that the grinding wheel is centered on the centering spike with the least possible eccentricity. The additional components required for the clamping process can be manufactured in a simple manner and actuated by means of an uncomplicated mechanism, i.e., with simple manipulations. One additional advantage can be seen from the fact that the individual components are combined into one structural unit, i.e., a structural unit in the form of the adapter according to the invention. This adapter can subsequently be combined with the relevant nominal diameter of the receptacle opening of the grinding wheel.

An additional development according to the present invention simplifies the precise central arrangement of the receptacle opening in the grinding wheel.

The radial elasticity of the axial extension can, for example, be controlled by means of its wall thickness or the transition of the axial extension into the clamping plate. The weakening line(s) provided in this particular embodiment can extend in the axial direction, the circumferential direction or even in a helical manner.

The clamping principle according to the invention can be used for directly clamping the grinding wheel onto a machine spindle, as well as for clamping said grinding wheel onto a separate tool system module, e.g., a standardized tool or workpiece receptacle.

If the centering spike is formed from a hollow shaft, a controllable radial elasticity is also attained within this region, i.e., by means of the shape of the hollow shaft or the point at which it transforms into the more massive carrier part. This measure provides the significant advantage that the axial extension can be driven between the centering spike and the grinding wheel such that even higher clamping forces are attained. In this case, an axial gap that still might exist between the clamping plate and the grinding wheel is compensated for due to the radially inward deformation of the centering spike in order to ensure the close surface contact between the grinding wheel and the clamping plate.

The clamping between the adapter and the hub can be realized by different means. In any case, the grinding wheel is received without radial play and a tight axial clamping between the grinding body and the hub is simultaneously attained. In one variation of the invention, a very good line of force is realized such that a tight axial clamping can also be attained.

An additional development according to the present invention results in a particularly simple handling, because only one adjusting part that is preferably arranged centrally and can be actuated outside of the adapter is required for realizing the axial clamping or pulling the adapter onto the centering spike.

If the clamping bodies are realized in accordance with one aspect of the present invention, a multiple force amplification that is able to maintain the axial and radial clamping in an even tighter manner can be attained with simple means.

The design of the clamping elements according to another aspect of the present invention, makes it possible to arrange the lines of force between the adapter and the hub in a very favorable manner or in a very small space such that the pulling power can be additionally increased.

The force transmission is also increased with the additional development.

The actuation of the clamping elements according to an additional development of the invention, is somewhat more complicated, but less effective due to the lack of any secondary lines of force. In this case, minute actuating forces that are applied by means of a tool that is easy to handle, e.g., in the form of a hexagonal socket, suffice for exerting very high axial forces between the adapter and the hub. This provides the significant advantage that the conical shape can be advantageously utilized for introducing the pressing forces required for separating the clamping connection. For this purpose, the central screw need only be turned in the separating direction until the cone adjoins a radially inward extending wall section of the hub part with its face surface that is situated opposite to the screw head, whereafter an increasing pressing force can be applied.

BRIEF DESCRIPTION OF THE DRAWINGS

Several embodiments of the invention are described in detail below with reference to the schematic figures. The figures show.

DETAILED DESCRIPTION OF THE PREFERRED EMBODIMENTS

Figure 1:
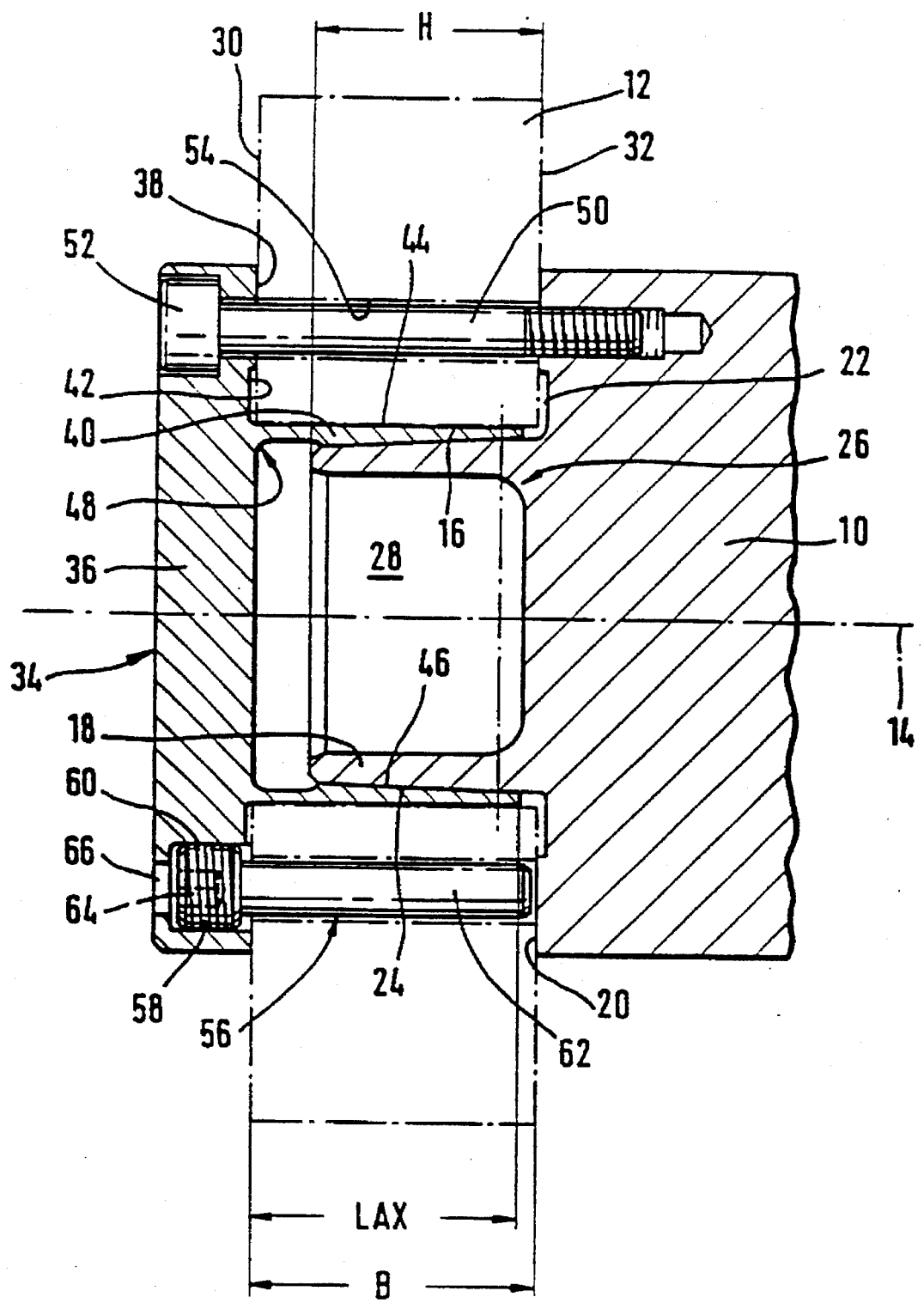
FIG. 1, a sectional view through a first embodiment of the arrangement an apparatus for receiving a grinding wheel on a hub part in a centered and axially fixed manner, with the hub part in this embodiment representing part of a machine tool spindle.

In FIG. 1, a carrier for a grinding wheel 12 is identified by reference numeral 10. In the embodiment according to FIG. 1, part 10 represents the spindle of a grinding machine. However, it should already be emphasized at this point that the invention is not limited to this arrangement. Part 10 can also represent any other tool or workpiece carrier. The grinding wheel 12 represents a body that steadily rotates at a very high speed and is pulled onto the spindle in such a way that a relatively high accuracy in terms of concentricity and the least possible wobble relative to the spindle axis 14 is attained. The grinding wheel 12 is, for example, formed by a high-speed grinding wheel that is provided with a diamond coating or a CBN (cubic boron nitride) coating and has a central cylindrical recess 16.

In order to position the grinding wheel 12 in a centered and axially fixed manner, the machine spindle 10 has a hollow centering spike 18 that extends in the axial direction and forms a transition into a radial collar 20 that is aligned perpendicular to the axis 14, with said transition preferably being realized by means of an undercut 22. The outer surface 24 of the centering spike 18 is formed by a conical surface with a flat cone angle. The wall thickness of the centering spike 18 is—as described in detail below—realized in such a way that a controlled radial elasticity of the centering spike is attained. This controlled radial elasticity can also be attained by providing the base 26 of the inner recess 28 with a special geometric contour.

An adapter part that is identified by reference numeral 34 is provided in order to fasten the grinding wheel 12 to the plane-parallel faces 30, 32 that extend perpendicular to the axis 14 onto the spindle 10 in a centered as well as axially and radially fixed manner. This adapter part is also realized as a rotationally symmetrical part, the axis of which coincides with the axis 14. The adapter part 34 has a clamping plate 36 that extends perpendicular to the axis 14 and is provided with a spot-faced clamping surface 38 that transforms into an axial and preferably thin-walled axial extension 40 via a relief groove 42. The outer surface 44 of this axial extension is adapted to the inner surface 16 of the cylindrical recess in such a way that a clearance fit between these surfaces is attained, while the connection is still separated. The hollow axial extension has an inner surface 46 that is realized in accordance with the cone angle of the outer surface 24 of the centering spike 18 such that the surfaces 46 and 24 closely adjoin in the clamped condition of the grinding wheel 12.

Reference numeral 48 identifies the region in which the axial extension 40 transforms into the clamping plate 36. This region is realized in such a way that it is possible to control the radial elasticity of the axial extension 40.

The axial length LAX of the axial extension 40 is adapted to the width B of the grinding wheel 12 and the height H of the centering spike 18 in such a way that the outer end of the axial extension 40 still has a sufficient axial distance from the undercut 22 on the spindle 10 in the solidly clamped condition of the grinding wheel 12.

Reference numeral 50 identifies several clamping screws, preferably 3 clamping screws, that are uniformly distributed over the circumference. The head 52 of said clamping screws is braced on a sunken surface of the clamping plate 36, with the threaded section of the clamping screws being engaged with a threaded hole in the spindle 10. The shaft of the clamping screws 50 extends through corresponding axial recesses 54 in the grinding wheel 12 with a certain amount of play.

In addition, several pressing screws 56 that are also uniformly distributed over the circumference are braced on the clamping plate 36. The threaded section 58 of these pressing screws is held in a threaded hole 60 of the clamping plate 36. A shaft section 62 that has a certain minimum distance from the radial collar 20 when the threaded section 58 screwed into the threaded hole 60 is situated adjacent to the aforementioned threaded section.

The threaded section 58 is provided with a hexagonal socket recess 64 into which a suitable tool for actuating the pressing screw 56 can be engaged through a hole 66.

When clamping the grinding wheel 12 onto the spindle 10, one proceeds as follows:

the grinding wheel 12 is threaded onto the axial extension 40 and this preassembled unit is subsequently pushed onto the centering spike 18 while applying practically no force at all. In this case, the parts 10, 36 and 12 are already situated in a predetermined position relative to one another, namely on a common central axis 14. At this point, the clamping plate 36 and the grinding wheel 12 can still be turned relative to the spindle 10 such that the holes that serve for receiving the clamping screws 50 can be aligned with the threaded holes in the spindle 10. According to FIG. 1, the grinding wheel 12 is subsequently pushed toward the right such that it comes in close contact with the radial collar 20, whereafter the clamping screws 50 are inserted. In this phase, an axial gap exists between the clamping surface 38 and the outer face side 30 of the grinding wheel 12.

The adapter part 34, i.e., the clamping plate 36 and the axial extension 40 according to FIG. 1, is moved toward the right by uniformly tightening the clamping screws 50. During this process, the axial extension comes in contact with the outer conical surface 24 of the centering spike 18. Due to its radial elasticity, the axial extension 40 is able to widen uniformly and radially outwardly such that the play between the outer surface 44 of the axial extension and the inner surface 16 of the cylindrical recess is gradually eliminated. The interfacing cylindrical surfaces are clamped against one another with continuously increasing force, while maintaining their centered position until the clamping surface 38 comes in contact with the face 30 of the grinding wheel 12. The continued turning of the clamping screws 50 results not only in an additional radial clamping of the grinding wheel 12 on the centering spike 18, but also in an increased axial clamping. Since only spot-faced surfaces that extend perpendicular to the axis 14 are in close contact with one another in accordance with the clamping principle previously described, the increased axial clamping intensifies the positive centering effect and thus excessive wobble is reliably eliminated.

The illustration according to FIG. 1 shows that the axial extension 40 practically fills out the entire space between the centering spike 18 and the inner recess 16 of the grinding wheel 12. In order additionally to improve the axial clamping of the grinding wheel 12, it is advantageous to adapt the dimensions of the centering spike 18 to the remaining geometry of the axial extension and the grinding wheel 12 in such a way that an elastic, radially inward deformation of the centering spike 18 occurs in the last stage of the clamping process in which the axial extension 40 is additionally driven in. This measure ensures that the clamping surface 38 reaches the outer face 30 of the grinding wheel 12 such that the axial fixing process is completed.

In the embodiment according to FIG. 1, the radial elasticity of the axial extension 40 is realized due to the fact that the axial extension is designed with very thin walls and provided with a circumferential weakening line within the region 48 in which it transforms into the clamping plate 36. However, this elasticity can also be realized or controlled in a different manner, e.g., by means of an axially or helically extending slot or several lines that weaken the axial extension, preferably in the form of at least one groove that either extends axially or helically on the outside or the inside of the axial extension 40.

In order to separate this connection, the clamping screws 50 are initially removed. The adapter part or the adapter 36 according to FIG. 1 is moved toward the left by uniformly turning the pressing screws 56. The axial extension 40 contracts radially inwardly such that the clearance fit between the outer surface 44 of the axial extension 40 and the inner surface 16 of the recess in the grinding wheel 12 is again attained. Consequently, the grinding wheel 12 can be removed from the adapter without applying practically any force at all.

Figure 2:
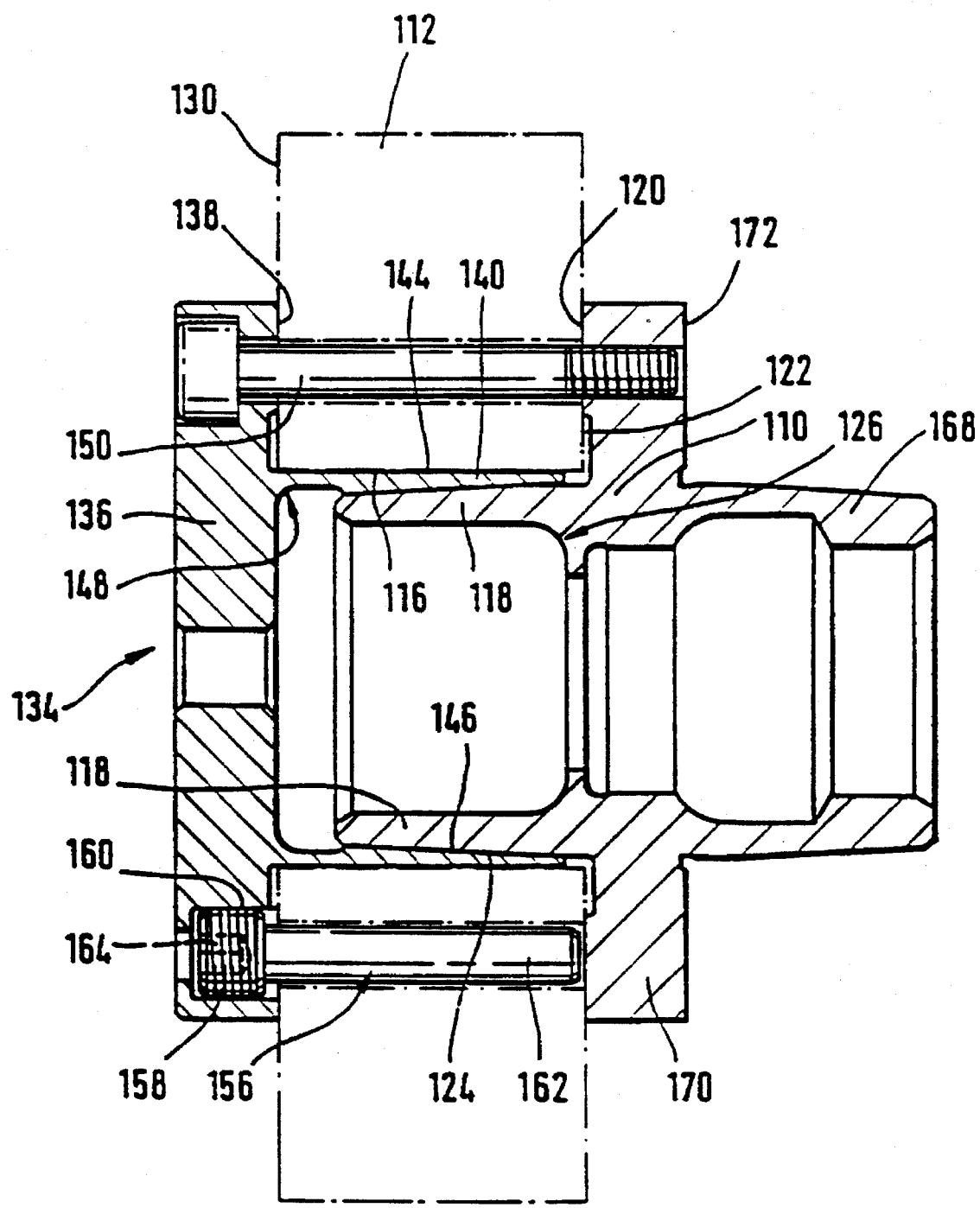
FIG. 2, illustrates a variation of the arrangement in which the grinding wheel is pulled onto a tool system module, with the illustration shown in this figure corresponding to that of FIG. 1.

The embodiment according to FIG. 2 only differs from the embodiment according to FIG. 1, due to the fact that a different carrier is provided for the grinding wheel 12. This is the reason why the detailed description of the clamping plate and the adapter part is not repeated. Components corresponding to the elements in the embodiment according to FIG. 1 are identified by similar reference numerals in FIG. 2, but prefixed by a "1."

FIG. 2 shows that the carrier part 110 carries a hollow shaft 168 on the side situated opposite to the centering spike 118. The carrier part 110 can be coupled onto an additional component of the tool clamping system via this hollow shaft. The hollow shaft 168 can have many different shapes and, for example, can be realized with a conical outer surface. In the embodiment according to FIG. 2, the radial collar 120 is arranged on a radial plate 170 that forms one additional face 172 on the side situated opposite to the radial collar 20. An axially fixed and centered clamping with the adjacent machine part is realized via the aforementioned additional face, namely with the aid of the hollow shaft 168 and suitable clamping means that are accommodated in its interior. As compared to the FIG. 1, the embodiment according to FIG. 2 provides the advantage that the predetermined diameter of the inner recess 116 in the grinding wheel 112 can be combined with different receptacle diameters of the spindle.

Figure 3:
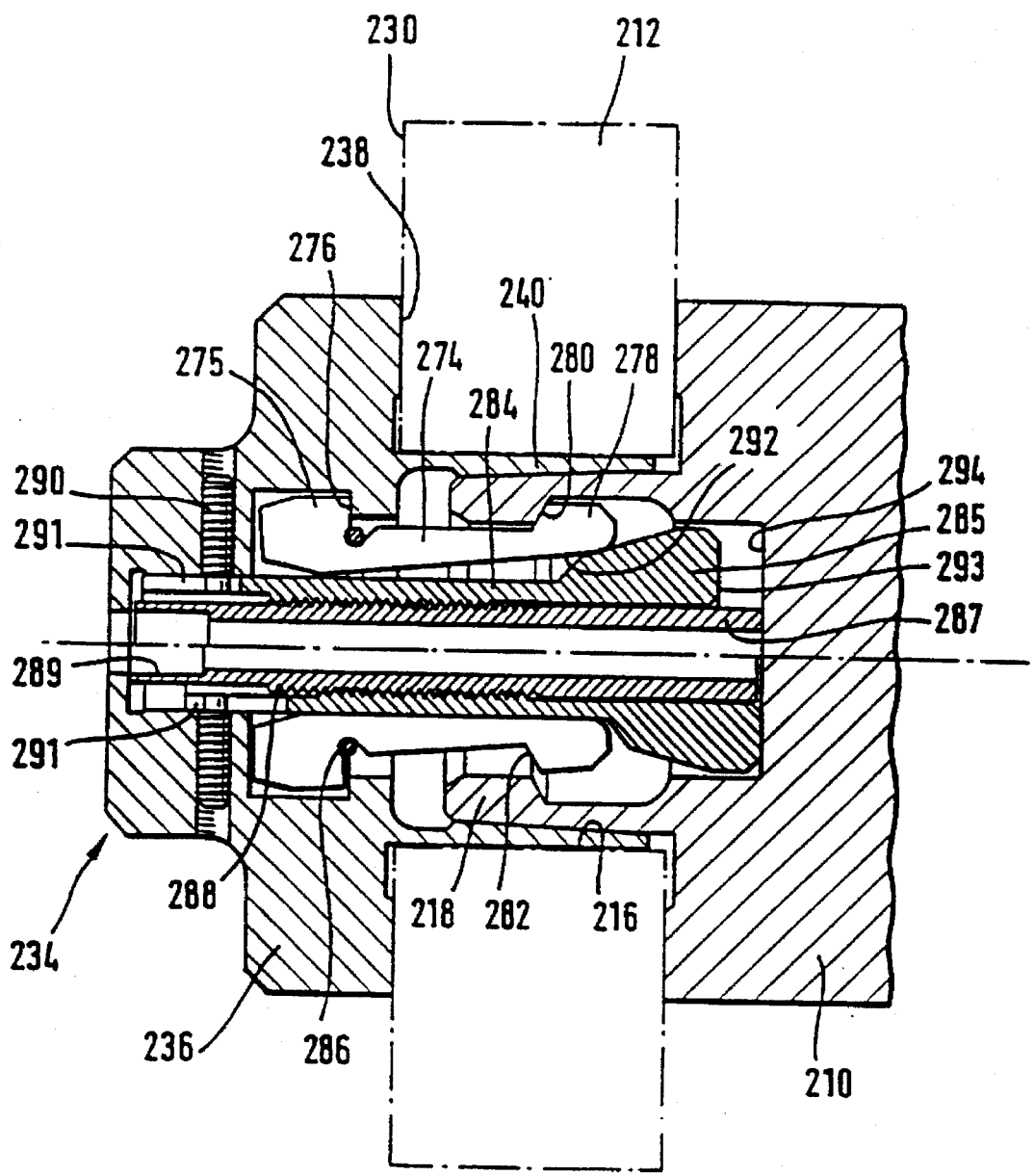
FIG. 3, wherein one additional embodiment is shown of the arrangement for clamping the grinding wheel onto a centering spike of a spindle, with the illustration shown in this figure being similar to that of FIG. 1 and the clamping means used in this embodiment being shown in the separated state in the lower half of FIG. 3.
Figure 4:
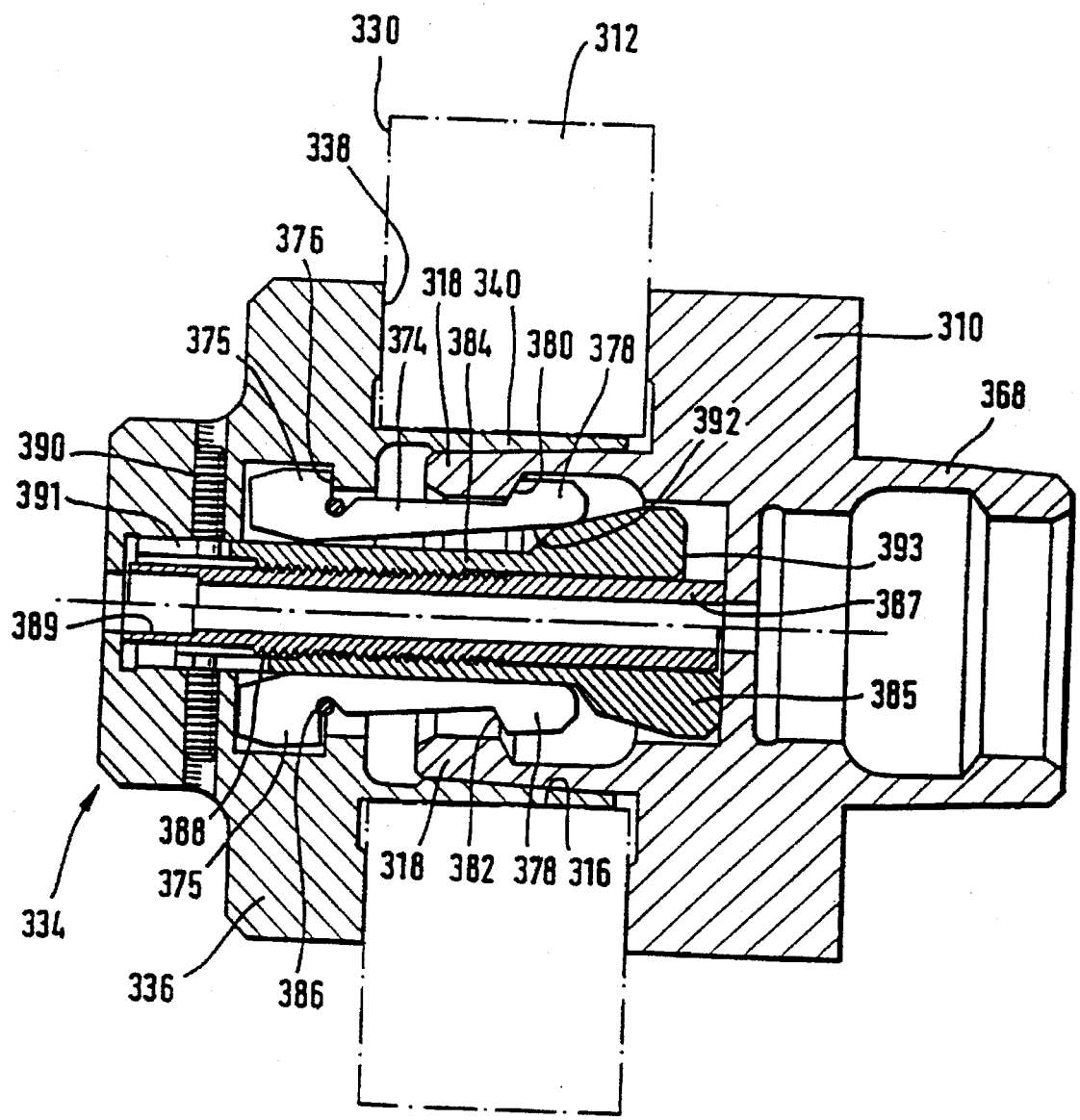
FIG. 4, wherein an illustration is presented of the embodiment according to FIG. 3 which corresponds to that shown in FIG. 2, with the clamping means used in this figure being illustrated in a separated state in the lower half of this figure, and FIG. 5, wherein a third embodiment is shown of the device for receiving a grinding wheel on a hub part in a centered and axially fixed manner, with the illustration shown in this figure being similar than the one in FIG. 4.
Figure 5:
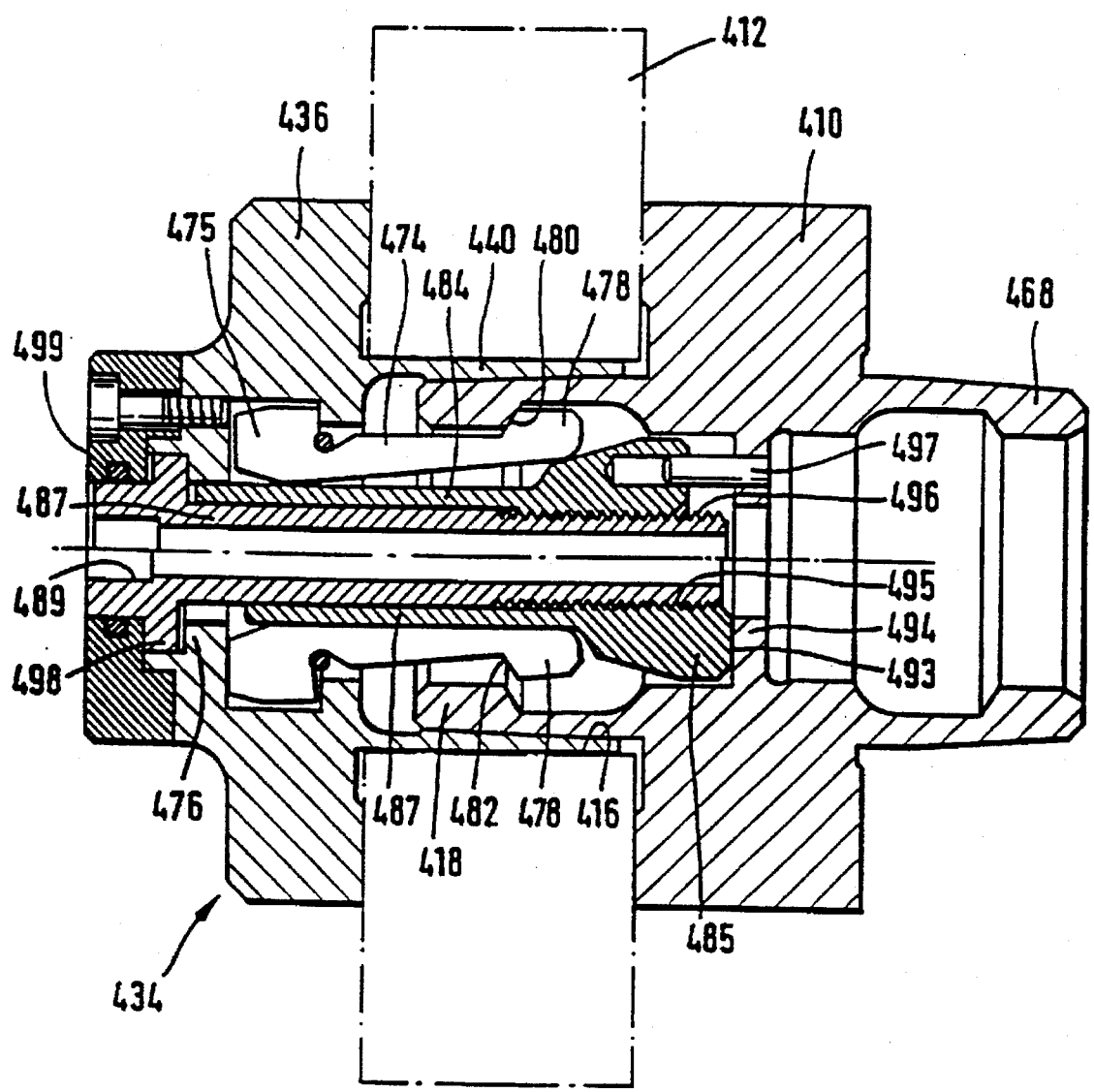

The embodiments according to FIGS. 3–5 differ from the embodiments described previously due to the fact that central clamping means are used for pulling the grinding wheel onto the spindle. One special feature of this embodiment can be seen from the fact that the clamping and removal of the grinding wheel is carried out with only a single rotary motion. In the embodiments according to FIGS. 3–5, components that correspond to the components used in the previously described embodiments are identified by similar reference numerals, but prefixed by a "2," "3" or "4."

In the embodiment according to FIG. 3, the adapter 234 accommodates in its interior several clamping bodies 274 that are uniformly distributed over the circumference. These clamping bodies are braced with a holding section 275 on an inner shoulder 276 of the adapter 234. At their other axially offset end, said clamping bodies form a catching section 278 that can engage an inner shoulder 280 of the centering spike 218 that is realized in the form of a hollow shaft in order to exert an axial clamping force. This arrangement preferably is realized in such a way that the inner shoulder 280 closely adjoins a clamping surface 282 as the radial movement of the catching section 278 increases. In this case, a force amplification takes place due to the conical design of the contacting support surfaces on the catching section 278 on the one hand and of the inner shoulder 280 on the other.

The clamping bodies 274 with their catching sections 278 can be synchronously moved radially outwardly or inwardly by means of a sleeve 284, at the end of which a cone 285 is arranged. In this case, an annular spring 286 is provided for realizing the return movement. The surface of the cone 285 is, in the attached condition of the grinding wheel 212, preferably adapted to the shape and position of the clamping bodies 274 in such a way that a surface contact between the cone 285 and the inner side of the catching sections 278 is attained in the attached condition. In this case, an additional force transmission is realized due to the inclination of the cone.

The movement of the cone 285 and the sleeve 284 in the axial direction is realized by means of a centrally arranged hollow screw 287, the external threads 288 of which engage the internal threads of the sleeve 284. According to FIG. 3, the left side of this hollow screw is provided with a hexagonal socket recess 289 in order to engage with an axially attached tool. Reference numeral 290 identifies radial pins that engage in a fitted fashion into axial grooves 291 of the sleeve 284 in order to prevent the latter from rotating.

If the hollow screw 287 is turned in one direction, the cone 285 according to FIG. 3 is driven toward the left and its outer surface contacts the inner surface 292 of the clamping bodies 274 such that the latter are pressed or pivoted outwardly with their catching section until they contact the inner shoulder 280. If the turning of the hollow screw 287 is continued the pressing force exerted by the catching sections 278 on the inner shoulder is gradually increased and the adapter part 234—as described previously with reference to the embodiments according to FIGS. 1 and 2—is gradually moved toward the right in FIG. 3 via the wedge-type gear that is formed by the wedge surfaces. During this process, the radially elastic axial extension 240 is continuously driven into the space between the hollow shaft 218 and the inner recess of the grinding wheel 212 until the clamping surface 238 reaches the left face 230 of the grinding wheel 212.

In the embodiment according to FIG. 3, a suitable shape for the transition between the hollow shaft 218 and the massive carrier part 210 ensures a certain radial elasticity of the hollow shaft 218 during the final clamping stage.

The hollow screw 287 is turned in the opposite direction for removing the grinding wheel 212 from the carrier part 210. Consequently, the cone 285 moves toward the right in FIG. 3 such that the surface contact between the outer conical surface and the inner surface 284 of the clamping bodies 274 is separated. The annular spring 276 causes the clamping bodies 274 to pivot inwardly such that the catching sections 278 disengage from the undercut shoulder 280. The lower half of FIG. 3 shows the state or position of the clamping bodies 274 in the separated condition. One can observe that the catching section 278 is moved sufficient distance radially inwardly, so as to make it possible to remove the adapter 234 from the carrier part 210. If the turning of the hollow screw 287 is continued, an end surface 293 comes in contact with a recess base 294 such that a pressing force is transmitted onto the adapter 234 via the sleeve 284. Consequently, the adapter and the axial extension 240 are together moved away from the left face 230 according to FIG. 3. Subsequently, the axial extension elastically contracts radially inwardly such that the clearance fit between the outer surface of the axial extension 240 and the inner surface of the recess 216 is again attained. The adapter with the grinding wheel 212 can then be removed without having to apply practically any force at all.

The embodiment according to FIG. 4 differs from the embodiment according to FIG. 3 only in that the carrier part 310 is not formed by a spindle, but rather an intermediate module 310 that carries an additional hollow shaft 368 on the side situated opposite to the centering spike 318. The aforementioned hollow shaft is comparable to the hollow shaft 168 in the embodiment according to FIG. 2. Consequently, the advantages attained with the embodiment according to FIG. 2 also apply to the embodiment according to FIG. 4. The part 310 can be used as an intermediate adapter so as to make it possible to attach the grinding wheel 312 to different receptacles.

In the embodiment according to FIG. 4, secondary lines of force occur during the clamping process due to the bracing of the hollow screw on the part 310. The embodiment according to FIG. 5 provides the advantage that the secondary lines of force act in the direction of the axial clamping force such that higher clamping forces are attained. In this embodiment, elements corresponding to the components used in the previously described embodiments are also identified by similar reference numerals, but prefixed by a "4."

The adapter 434 in this embodiment is realized as a two-part adapter. Clamping bodies 474 that are uniformly distributed over the circumference are accommodated in the interior of the clamping plate 436, i.e., in a captive fashion. This is realized due to the fact that the clamping bodies are braced radially inwardly on the clamping sleeve 484. In contrast to the previously described embodiments according to FIGS. 3 and 4, the sleeve 484 is provided with interior threads 495 that engage with exterior threads 496 of the hollow screw 487 within the region of the cone 485. An axial pin that is represented by reference numeral 497, engages in a hole on the face of the cone 485 so as to prevent the sleeve 484 from rotating.

The hollow screw 487 is provided with a radial collar 498 that, with the aid of a plate 499, holds said hollow screw on the adapter 436 in the axial direction, but in such a way that the hollow screw can still be turned. The plate 499 and the clamping plate 436 are connected by screws.

Reference numeral 489 identifies an hexagonal socket recess that serves for attaching a suitable tool so as to be able to move the hollow screw 487 that in turn moves the sleeve 484.

In this embodiment, the cone 485 is also used as a pressing means as shown in the lower half of FIG. 5. When moving the cone 485 toward the right, the face 493 of the cone 485 contacts a shoulder 494 of the carrier part 410 such that the pressing force is introduced.

It goes without saying that modifications of the previously described embodiments are possible without deviating from the scope of the invention. It is, for example, possible to provide the axial extension with a cylinder on the inside and a cone on the outside. Although the previously described embodiments indicate a close surface contact between the grinding wheel and the axial extension, as well as between the axial extension and the centering spike, it should be emphasized that it is not absolutely imperative to attain a full-surface contact. The same also applies to the design of the wedge-type gear. The clamping surface 38, 138, 238, 338 and 438 can also be formed by a conical surface. Numerous variations can be considered for the axial weakening line of the axial extension, e.g., an axial slot or a slot that either extends in the axial direction in the form of a straight line or a helical line.

Consequently, the invention discloses an arrangement for receiving a rotating body, in particular a grinding wheel, on a carrier part in a centered and axially fixed manner. The carrier part comprises an axial centering spike that protrudes into a central receptacle opening of the rotating body and an essentially radial collar that is situated adjacent to the axial centering spike and against which the rotating body can be axially clamped. In order to allow the highly accurate clamping of extremely rapidly rotating bodies by means of simple manipulations, a preferably thin-walled axial extension that can be elastically widened is arranged between the centering spike and the receptacle opening. This axial extension is braced on the outer surface of the centering spike and the inner surface of the receptacle opening and connected in one piece with a clamping plate so as to form an adapter part. Preferably captive clamping means are accommodated in the adapter part. These clamping means that are braced on the adapter part and the carrier make it possible to press a radial collar of the clamping plate against the rotating body, while the axial extension is elastically widened.

I claim:

1. An apparatus for receiving a rotating body, in particular a grinding wheel, in a centered and axially fixed manner, which comprises:

a clamping plate;

a carrier having an axial centering spike that is protrudable into a central receptacle opening of the rotating body and a substantially radial collar that is situated adjacent the axial centering spike and with which the rotating body is axially positionable;

a thin-walled axial extension that is elastically widenable and is braced on an outer surface of the centering spike, the inner surface of the receptacle opening being arranged between the centering spike and the receptacle opening, and a clamping mechanism by which the axial extension is pressable onto the centering spike wherein the axial extension is elastically widenable in a radial direction, said thin-walled axial extension being connected as one piece to said clamping plate and said clamping extending radially outwardly over the axial extension so as to form an adapter, and a plurality of clamping mechanisms that are connected to the adapter and the carrier wherein the clamping plate includes a radially outwardly extending radial collar which is engageable against the rotating body, and wherein the axial extension is elastically widenable such that the rotating body is axially clamped against the radial collar.

2. Apparatus according to claim 1, wherein the receptacle opening of the rotating body is cylindrically shaped and the centering spike has a conical outer surface.

3. Apparatus according to claim 1, wherein the axial extension has at least one weakening line controlling its radial elasticity.

4. Apparatus according to claim 1, wherein the centering spike is positionable on a machine spindle.

5. Apparatus according to claim 1, which comprises a tool system module on which the centering spike is located wherein the tool system includes one additional centering extension which is coupled to one of a tool and a workpiece carrier on a side situated opposite said centering spike.

6. Apparatus according to claim 1, wherein the centering spike comprises a hollow shaft.

7. Apparatus according to claim 6, wherein the hollow shaft is provided with a circumferential inner shoulder, the clamping bodies are pressed against the inner shoulder, the clamping bodies are braced on a part of the adapter, and wherein the clamping bodies are radially outwardly moveable by an adjusting part that is actuatable outside the adapter so as to attain an increasingly rigid contact with the inner shoulder.

8. Apparatus according to claim 7, wherein the inner shoulder has a conical surface with which the clamping bodies come into contact during radially outward movement thereof.

9. Apparatus according to claim 7, wherein the clamping bodies respectively comprise parts of said clamping bodies and wherein the clamping elements are axially offset relative to the clamping bodies and form a holding section by which the clamping elements are axially braced on the adapter.

10. Apparatus according to claim 9, wherein the clamping elements are U-shaped and have arms which form the holding section and a catching section, a ridge portion of the clamping mechanism extends in an axial direction over a location at which the carrier and the adapter are joined, and wherein an undercut radial shoulder is formed in the adapter in order to brace the holding section.

11. Apparatus according to claim 7, wherein the clamping bodies are braced radially inwardly on a cone that is moveable in the axial direction so as to move the clamping bodies in a radial direction with a controlled force.

12. Apparatus according to claim 11, wherein the cone is situated on an inner end of a sleeve that extends in the axial direction and braces arms of the clamping bodies.

13. Apparatus according to claim 12, which comprises a device contacting the cone and preventing the cone from rotating.

14. Apparatus according to claim 12, wherein the sleeve engages with a centrally extending screw by threads of the screw, one side of the centrally extending screw is braced on a radial wall of the carrier, and another side of the centrally extending screw is braced on a shoulder of the adapter and forms an inner recess so as to permit attachment of an actuating tool that is centrally inserted from an outside location in the axial direction.

15. Apparatus according to claim 12, wherein the sleeve is provided with interior threads within a region of the cone, the interior threads engage with a screw that extends in the axial direction and a head of the screw is axially fixed but rotatable in the adapter, and a radial shoulder is provided on the carrier for an inner surface of the cone such that the cone is pressed against the radial shoulder in order to generate a pressing force.

16. Apparatus according to claim 1, wherein the clamping mechanism comprises a plurality of axial clamping screws that are uniformly distributed over a circumference of the clamping plate and extend through corresponding axial recesses in the clamping plate and the rotating body, and wherein the clamping screws engage with corresponding threaded holes formed in the radial collar of the carrier.

17. Apparatus according to claim 16, wherein a plurality of pressing screws are uniformly distributed over the circumference of the clamping plate, a threaded section of the pressing screws engages with the clamping plate, and a shaft section of each of the pressing screws extends through a corresponding axial access formed in the rotating body.

18. Apparatus for receiving a rotating body, in particular a grinding wheel, in a radially and axially fixed manner, which comprises:

a carrier part having an axial centering spike that is protrudable into a central receptacle opening of the rotating body and a substantially radial collar situated adjacent to the axial centering spike and with which the rotating body is axially positionable, an adapter comprising an axial extension which is elastically widenable and has a surface that engages the outer surface of the centering spike and the inner surface of the receptacle opening, wherein a thin-walled axial extension is connected as one piece to a clamping plate that is connected to said axial extension, and a clamping mechanism axially clamping together the adapter and the carrier part is connected to the clamping plate such that the clamping plate is pressed against a radial collar that is engageable against the rotating body, and wherein the axial extension is elastically widenable and the radial collar is clamped.

19. Apparatus according to claim 18, wherein the axial extension is provided with at least one weakening line such that the radial elasticity of the axial extension is controllable.

20. Apparatus according to claim 18, wherein the clamping mechanism comprises a plurality of axial clamping screws that are connected to the adapter.

21. Apparatus according to claim 20, which comprises a plurality of pressing screws wherein a threaded section of the pressing screws engage with the clamping plate.

22. Apparatus according to claim 18, which comprises a plurality of clamping bodies that are braced on a part of the adapter, and wherein the clamping bodies are moveable radially outwardly by an adjusting part that is actuated outside of the adapter so as to attain an increasingly rigid contact with an inner shoulder of the grinding wheel.

23. Apparatus according to claim 22, wherein the clamping bodies respectively comprise parts of clamping elements that form a holding section that is axially offset relative to the clamping bodies, and wherein the holding section braces the clamping elements on the adapter in the axial direction.

24. Apparatus according to claim 23, wherein the clamping elements are substantially U-shaped and have arms which form the holding section and have a ridge which extends in the axial direction from the interior of the axial extension into an undercut groove via a radially inwardly protruding projection so as to brace the holding section.

25. Apparatus according to claim 23, which comprises a cone wherein the clamping bodies are braced radially inwardly on said cone and said cone is axially moveable by an externally actuated gear so as to move the clamping bodies in the radial direction with a controlled force.

26. Apparatus according to claim 25, wherein the cone is situated on an inner end of a sleeve that extends in the axial direction and braces the arms of the clamping bodies.

27. Apparatus according to claim 26, which comprises a device contacting said cone and preventing the cone from rotating.

28. Apparatus according to claim 26, which comprises a centrally extending screw wherein the sleeve engages with said screw by means of threads of said screw, and said screw is provided with an inner recess on a side thereof that faces the clamping plate for permitting attachment of an actuating tool that is centrally insertable from an outside location in the axial direction.

29. Apparatus according to claim 26, wherein the sleeve has interior threads within a region of the cone, the interior threads engage with a screw that extends in the axial direction and a head of the screw is arranged in the adapter so as to be axially fixed but rotatable, and wherein a radial shoulder for an inner surface of the cone is provided on the carrier part such that the cone is pressed against the radial shoulder in order to generate a pressing force.

* * * * *